United States Patent [19]

Griffith

[11] Patent Number: 5,312,658
[45] Date of Patent: May 17, 1994

[54] CONDUITS HAVING A SHOCK ABSORBING SHELL AND METHOD FOR THEIR FORMATION

[75] Inventor: Frederick L. Griffith, Hampton, N.J.

[73] Assignee: Progressive Polymerics Inc., Moonachie, N.J.

[21] Appl. No.: 26,947

[22] Filed: Mar. 5, 1993

Related U.S. Application Data

[62] Division of Ser. No. 696,617, May 7, 1991, Pat. No. 5,217,667.

[51] Int. Cl.⁵ .................. B29D 22/00; H01R 4/00
[52] U.S. Cl. .................. 428/34.4; 428/34.6; 428/34.7; 428/36.9; 428/36.91; 174/93
[58] Field of Search ............ 428/34.4, 34.6, 34.7, 428/36.9, 36.91, 703; 174/68.3, 96, 98, 93

[56] References Cited

U.S. PATENT DOCUMENTS

| | | |
|---|---|---|
| 1,318,520 | 10/1919 | Wolever . |
| 2,958,907 | 11/1960 | Mumford et al. ............ 18/59 |
| 3,366,719 | 1/1968 | Lueders ............ 264/47 |
| 3,484,516 | 12/1969 | Simons ............ 264/254 |
| 3,491,171 | 1/1970 | French ............ 264/45 |
| 3,737,493 | 6/1973 | Hacker ............ 264/42 |
| 3,754,064 | 8/1973 | Snelling et al. ............ 264/40 |
| 3,816,582 | 6/1974 | Tennyson ............ 264/255 |
| 3,958,582 | 5/1976 | Noda et al. ............ 138/149 |
| 4,054,473 | 10/1977 | Ohnstad ............ 156/71 |
| 4,110,991 | 9/1978 | Torkuhl ............ 405/157 |
| 4,186,162 | 1/1980 | Daley ............ 264/46.5 |
| 4,229,403 | 10/1980 | Guleserian ............ 264/263 |
| 4,247,516 | 1/1981 | Morgan ............ 264/503 |
| 4,338,153 | 7/1982 | Zimmerman ............ 156/391 |
| 4,377,547 | 3/1983 | Hervig ............ 264/262 |
| 4,382,055 | 5/1983 | Koyanagi et al. ............ 264/133 |
| 4,390,383 | 6/1983 | van Dongeren ............ 156/196 |
| 4,405,398 | 9/1983 | Rother et al. ............ 156/242 |
| 4,548,779 | 10/1985 | Steinberg et al. ............ 264/255 |
| 4,588,467 | 5/1986 | Tani et al. ............ 156/294 |
| 4,592,886 | 6/1986 | Mannherz ............ 264/262 |
| 4,623,755 | 11/1986 | Henkel et al. ............ 174/110 S R |
| 4,670,315 | 6/1987 | Hillemeier et al. ............ 428/36 |
| 4,686,075 | 8/1987 | Dziewanowski et al. ............ 264/209.2 |
| 4,759,663 | 7/1988 | Watanabe et al. ............ 405/217 |
| 4,820,561 | 4/1989 | Pithouse et al. ............ 428/34.5 |
| 4,885,194 | 12/1989 | Tight, Jr. et al. ............ 428/36.91 |
| 4,956,032 | 9/1990 | Hahn et al. ............ 156/94 |
| 5,147,697 | 9/1992 | Ijyuin et al. ............ 428/36.91 |

FOREIGN PATENT DOCUMENTS 47-42619 10/1972 Japan .

Primary Examiner—George F. Lesmes
Assistant Examiner—Blaine Copenheaver
Attorney, Agent, or Firm—Kenyon & Kenyon

[57] ABSTRACT

In accordance with the invention, a concrete conduit is completely encased within a shell of a plastic resin such as polyethylene. The plastic shell functions to insulate the concrete conduit from mechanical shocks thereby preventing breakage and cracking of the conduit. The shell also effectively provides an impermeable barrier for water vapor and a smooth, relatively frictionless, surface for receiving electric cables, wires and the like. The conduit is made by preforming the shell, for example by rotational molding, and filling the shell with pourable cement through a filler hole in the shell. The filler hole can then be closed with a plug of the resin used to form the shell.

17 Claims, 3 Drawing Sheets

CONDUITS HAVING A SHOCK ABSORBING SHELL AND METHOD FOR THEIR FORMATION

This is a division of application Ser. No. 07/696,617 filed May 7, 1991, now U.S. Pat. No. 5,217,667.

BACKGROUND OF THE INVENTION

1. Field of the Invention

The invention relates to conduits and pipes generally, and particularly to concrete conduits used to house subterranean electric cable and/or other utility wires.

2. Description of Related Art

Power companies frequently lay electric cables and other utility wires underground. The subterranean placement of power lines offers a variety of well known advantages including public safety. In addition, the need for erecting and placing utility poles is avoided.

One problem with laying power lines in this manner is that the relatively harsh subterranean environment including, for example, silt, water and various pollutants has a tendency to cause corrosion of the plastic insulation surrounding the electric cable. For example, processes have been known to occur which are referred to as electrochemical treeing ("ECT") or water treeing. These processes lead to the development of branched tree-like cracks in the insulation commonly referred to as ECT structures or water trees.

In an attempt to overcome these problems, power companies have required that subterranean cables be housed within concrete conduits to protect the cables from the environment. Power companies have adopted specifications for these concrete conduits which are designed to ensure adequate protection for the cables which they house. For example, the conduit is required to have a square cross section to allow for stacking of multiple conduits on top of one another and a smooth concentric interior bore for receiving cable with minimal friction. The ends of each conduit are provided with extensions for receiving a plastic coupling which functions to join each conduit section in end-to-end fashion with another conduit section. The coupling is typically a polyvinlychloride tube which is force fitted around the relatively abrasive extension ends of adjoining conduits with sufficient pressure so as to prevent foreign matter from entering the conduit. Another important requirement is that the conduits must be free from cracks, broken ends, defects and all irregularities.

A major disadvantage associated with the use of concrete conduits is the very high breakage and cracking rate which is encountered during handling. Some utility companies have estimated that, on the average, 30% or more of all concrete conduits are broken during shipping, handling and storage even before they are used.

In addition, compliance with other power company specifications has proved to be troublesome for conduit manufacturers using conventional pressure molding techniques for cement. For example, the extension ends of the conduit must be physically machined when the concrete is in a semi-solid state after pressure molding.

Other drawbacks to the use of concrete conduits are that they are not completely effective in preventing water vapor from coming into contact with the cables because of the porous nature of the concrete. In an attempt to solve this problem, clay has been incorporated into the concrete to decrease its permeability. However, the use of clay is not desirable because there is a tendency for the clay to break off and contaminate the inside of the conduit.

A further drawback of concrete conduits is that the abrasive interior surface of the bore hinders the pulling of electric cables through the conduit. Because of the difficulty of pulling long sections of power cables through the conduit, power companies have had to interrupt the conduits with frequent pit sections in which the cables are spliced together with separate cable sections, thus increasing electrical resistance and the possibility of electrical failure.

In the manufacture of concrete sewer pipes it has been known to provide a corrosion resistant plastic lining along the inside surface of the pipe to prevent corrosion of the concrete caused by sewage inside the pipe. However, the lining along the inside surface has not reduced the tremendous breakage and cracking rate associated with concrete conduits. In addition, these concrete sewer pipes must be produced by conventional pressure molding techniques followed by a coating process for lining the inside surface with plastic. Coating can be difficult to accomplish, requiring several complicated process steps. For example, see U.S. Pat. Nos. 4,054,473, 4,338,153 and 4,670,315.

Accordingly, it is an object of the present invention to provide a concrete conduit which exhibits virtually no breakage or cracking during shipping and routine handling.

It is another object of the invention to provide a conduit which is virtually impermeable to water vapor.

It is a further object of the invention to provide a method for making a virtually unbreakable conduit which does not require the use of conventional pressure molding.

It is a further object of the invention to provide a conduit for housing electric cable having smooth inner and outer surfaces to facilitate sliding of cables through the conduit and easy handling.

SUMMARY OF THE INVENTION

In accordance with the invention, a concrete conduit is completely encased within a shell of a plastic resin such as polyethylene. The plastic shell functions to insulate the concrete conduit from mechanical shocks thereby preventing breakage and cracking of the conduit. For this purpose, preferably a small gap is provided between the outside surface of the concrete and the plastic shell. The shell also effectively provides an impermeable barrier for water vapor and a smooth, relatively frictionless, surface for dragging electric cables, wires and the like. The conduit is made by preforming the shell, for example by rotational molding, and filling the shell with pourable cement through a filler hole. As the cement cures it shrinks thereby leaving an air gap between the concrete and the shell. The filler hole is then closed with a plug of the resin used to form the shell. Using this method, concrete pressure molding and plastic resin coating steps are avoided.

DETAILED DESCRIPTION OF THE INVENTION

Figure 1:
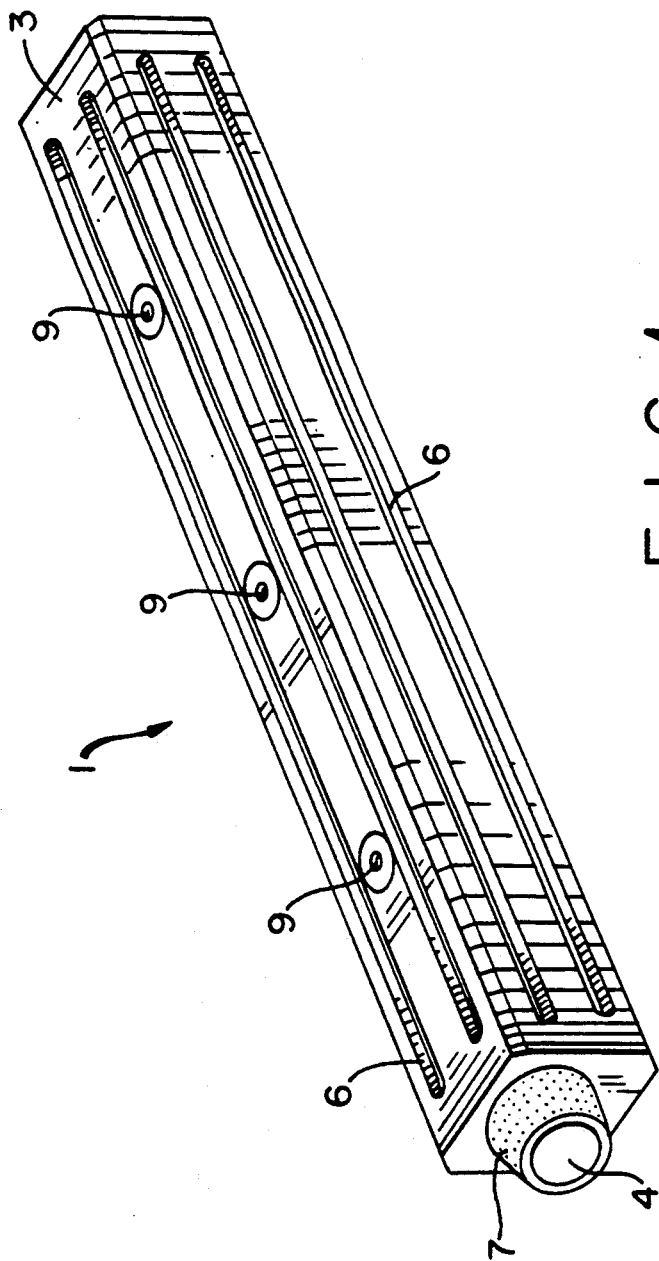
FIG. 1 is a perspective view of a conduit in accordance with the invention.
Figure 2:
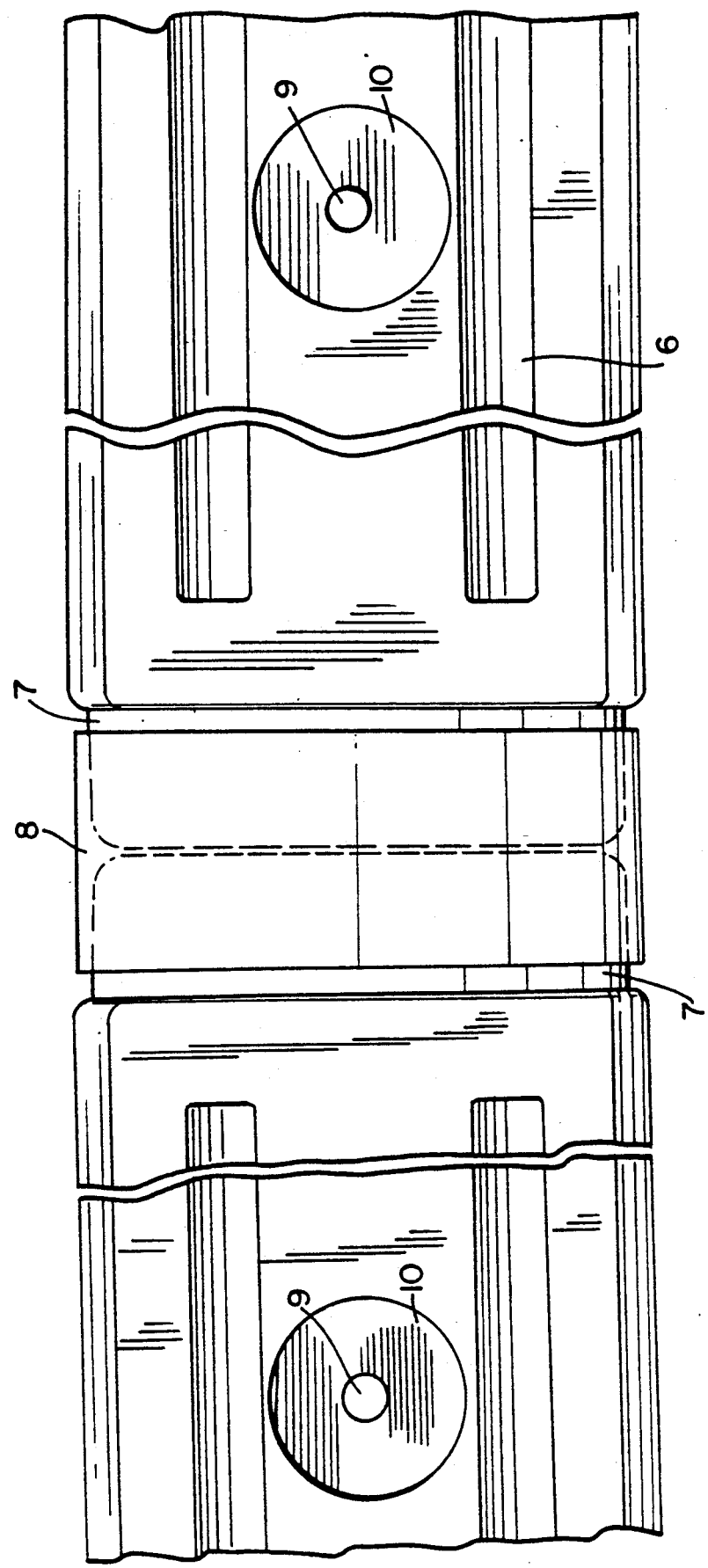
FIG. 2 is a side view of two conduits of the invention connected end to end.
Figure 3:
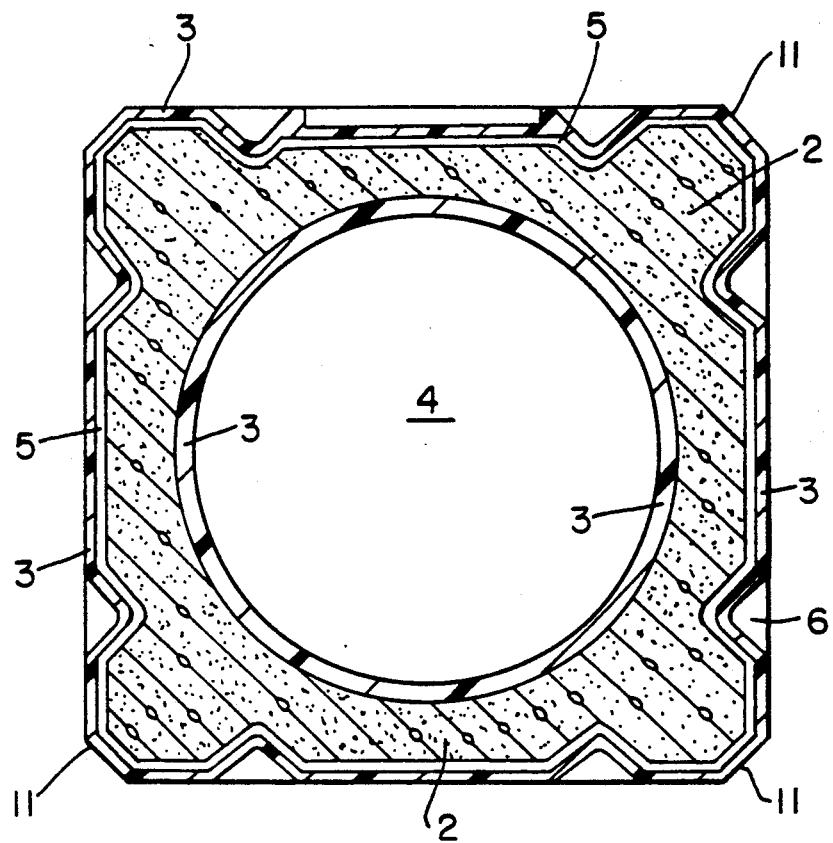
FIG. 3 is a cross sectional view of a conduit in accordance with the invention.

The conduit of the invention is illustrated in FIGS. 1, 2 and 3. The conduit 1 is an elongated hollow tubular member of concrete 2 which is encapsulated on all sides with a plastic shell or skin 3. The plastic shell 3 is preferably polyethylene. The conduit is provided with a concentric bore 4 for housing, for example, electric cable, wires and the like or for transporting water and other materials. It has been found that the plastic shell 3 functions to insulate the concrete from mechanical shocks thereby helping to prevent breakage and cracking of the concrete. For this purpose, the shell is preferably between about 0.0625 inches thick and 0.125 inches thick.

To further enhance the shock absorbing quality of the conduit, preferably a small gap 5 on the order of about 1 or 2 mm is provided between the outside surface of the concrete and the plastic shell. In this way, upon absorbing a shock the shell will resist deformation and movement across the gap in the direction toward the concrete. The resistance to deformation which is provided by the shell coupled with the air cushion in the gap increases the shock absorbing potential of the shell.

As illustrated, the outside surface of the conduit is preferably substantially square rather than round so that the conduits can be stacked. For stacking purposes it has also been found that the outside surface of the shell 3 is preferably provided with ribs or channels 6 for enhanced stability. As illustrated, there are preferably two channels on each side evenly distributed around the shell.

The cement used to form the concrete portion 2 of the conduit can be standard Portland Cement. As known to those skilled in the art, the water used in mixing the cement should be generally free from oils, acids, alkalies and vegetable matter.

The plastic shell 3 can be formed from any polymer which can maintain the structural integrity of the shell. Preferably, a thermoplastic resin is used. Examples of suitable resins for the shell include: polyethylene (low to high density or cross linked), polyvinylchloride, polypropylene, polycarbonate, polybutylene, nylon, polyester, urethane, flurocarbon and butyrate. Polyethylene is preferred.

Preferably, the polyethylene or other polymer used to form the shell includes up to about 40% by weight of a zeolite filler. It has been found that the presence of the zeolite filler increases the strength of the finished product and reduces the amount of smoke generated in the event of a fire. In addition, the presence of pozzolanic filler in the plastic shell 3 affects the heat transferability of the plastic to help dissipate heat generated inside the conduit, for example, by electric cables during heavy current draw or load.

The conduit can be formed with a cylindrical extension 7 on each end to facilitate joining of conduits in end to end fashion. The extensions 7 are a continuous part of shell 3 and are preferably regions slightly smaller in outer cross section than the remainder of the conduit as illustrated.

Referring to FIG. 2, the conduits are joined in end to end fashion by a coupling or connector 8 which receives a cylindrical extension 7 of adjoining conduits. In the case of conventional all concrete conduits the connector 8 is typically a PVC tube which is of a diameter small enough to snugly receive the conduit cylindrical extensions 7 into both of its open ends. The connector can therefore be pressure fit onto the conduits. The relatively abrasive surface of the concrete prevents the PVC coupling from slipping off the conduit extensions after pressure fitting.

However, in the case of the present invention wherein plastic shell 3 is the exposed surface, it has been found that the coupling 8 is preferably coated with a paraffin wax. The paraffin wax is more effective in preventing slippage of the connector 8 off the plastic shell 3 of the conduit of the present invention. Pressure fitting of connector 8 over extensions 7 provides a water impermeable seal when the conduits are joined.

It will be appreciated by those skilled in the art that other means to facilitate joining of the conduits may be provided in lieu of extensions 7. For example, engageable male-female connectors may be provided on the ends of the conduit. The use of male-female connectors eliminates the need for coupling 8.

Typical power company specifications for conduits for housing electric cables provide for an inner bore diameter of four inches and a six inch square cross section for secondary power cables and a 5 inch bore with a 7 inch square cross section for primary power cables. It should be appreciated that in the case of the present invention the thickness of the plastic shell should be taken into account in constructing a conduit of these dimensions.

The conduit of the invention is formed by first preforming the plastic shell, for example, by a rotational molding process. The plastic shell is formed with or is later provided with one or more holes 9 for receiving the cement. In the case of a conduit about 4 feet long, preferably 3 holes are evenly distributed along the length of the conduit. Preferably, a circular recessed region 10 (see FIG. 2) is formed in the shell 3 around the hole 9 so as to fit a plug for subsequently closing the hole. The cement is poured or pumped into hole 9 to fill the shell. The cement contracts as it hardens thereby leaving the small air gap 5 between the outer part of the shell and the outside surface of the concrete 2 in the final product.

Air is trapped in the shell during flow of cement into the shell. This is desirable to enhance the shock absorbing characteristic of the conduit as described above. However, it can be seen from the cross-sectional view in FIG. 3 that the concrete portion 2 of the conduit is thicker near the corners of the conduit than near the middle of each of the sides. When the shell is filled while resting on one of its sides much of the air will become trapped near the top of the shell in the vicinity where the concrete is the least thick. To more evenly distribute the air gap near the corners where the concrete portion is thickest, it is preferred to fill the shell while it is tilted so as to stand on one of its four flattened corners 11.

After the cement has been injected or poured into the hole 9 the hole 9 may be closed with a plug of the polymer used to form the shell. The plug is of a size and shape (i.e., circular) to fit in the recessed region 10. A conventional high speed rotor can be used to spin weld the plug to the recessed region. For example, in the case of polyethylene, about 22,000 rpm is sufficient to create enough friction and heat to soften the plug and shell 3 so as to create a seal between them.

Filling the preformed shell with cement can slightly distort the shape of the shell making it difficult to stack the conduits. The longitudinally disposed ribs 6 described above overcome this problem and stabilize the conduits for stacking.

In typical applications for electric cable, specifications call for the conduits to be four feet long with an inner bore diameter of about four inches. Shells of this type can be formed by rotational molding.

Rotational molding is a well-known process primarily utilized in the manufacture of hollow objects from thermoplastic materials. Solid (i.e., powder) or liquid polymeric material is placed in a mold. The closed mold is then heated and cooled while being rotated about two perpendicular axes. During the heating stage (typically in an oven), the powdered material partially fuses together and forms a porous skin on the mold surface. The resin gradually melts together to form a homogeneous layer of uniform thickness. When molding a liquid material, it tends to flow and coat the mold surface until the gel temperature of the resin is reached, at which time all flow ceases.

As is known, sufficient time must be allowed in the oven for the resin material to completely distribute and fuse. The mold is then transferred to a cooling station where rotation is maintained. Cooling is accomplished by forced air and/or water. After the mold has cooled it is transferred to a work zone where it is opened and the finished part removed.

In rotationally molding the plastic shell 3 for the conduit of the present invention it has been found that the following special adaptations result in the best seal being formed at the ends of the shell. Rather than rotationally molding the shell in one step, a plastic pipe, which will eventually be the inside surface of the shell, is first extruded in a conventional manner. The resin used in extruding the pipe can include up to about 60% by weight of a zeolite filler as described above. The pipe is positioned inside the mold for the shell supported on mandrels. After the resin is added to the mold the mold is flushed with nitrogen and closed and the rotational molding process is conducted to form the shell. The resin used in forming the rotationally molded part of the shell can include up to about 40% by weight of a zeolite filler.

In order to provide the best seal between the ends of the interior plastic pipe and the rotationally molded part of the shell, the pipe must soften before fusing with the molten resin in the mold. However, if the pipe softens too much it will loose its structural integrity or collapse before the heating cycle is completed. To overcome this problem plasticizers or other conventional additives are added to the resin used to form the pipe so as to raise its melt index. The pipe melt index is adjusted so that it is greater than the melt index of the resin used to form the shell. The oven temperature for the heating cycle is set high enough so that the resin in the mold will melt but not high enough to melt the pipe.

The ends of the pipe which must be fused with the molded resin are selectively softened by adjusting the mandrel temperature to be higher than the oven temperature. In this way the elevated mandrel temperature will soften the pipe so that it can readily fuse with the molten resin in the mold. Preferably, the melt index of the pipe is adjusted so that it will soften at a temperature of about 20° F.–30° F. greater than the oven temperature used to melt the resin in the mold.

In forming the best seal between the pipe and the rotationally molded part of the shell, it is also preferred to curve the mandrels at the points where they come into contact with the mold so that a continuous curved surface is provided linking the ends of the mold with the ends of the pipe. In this way the ends of the final product will be round and the point of seal between the pipe and the rotationally molded portion of the shell will be slightly recessed inside the conduit.

As described herein, typically conduits for subterranean cables are required to be constructed of concrete which is free of cracks to protect the cables from the environment. However, since the shell 3 used in the conduit of the present invention is impermeable to water vapor, sediment and other harmful agents, it will be appreciated that pure concrete will no longer be necessary in the formation of such conduits. For example, the shell of the invention can be filled with modified concrete or polymer concrete containing non-toxic waste material fillers such as fly ash, pulverized waste glass, pulverized magazines and newspapers, pulverized tires and the like. In the case of including about 15%–20% by weight of magazines in the concrete wherein the bright color print includes heavy metal oxides it is important to also include about 7%–12% zeolite filler in the concrete to absorb the heavy metals. In the case of a fly ash filler up to about 15% by weight in the concrete material can be used.

Since the plastic shell of the inventive conduit provides two relatively impermeable barriers (i.e., the outside surface of the shell and the pipe portion the shell) it would not matter that such modified concretes having waste material fillers may be inferior to ordinary Portland Cement. Furthermore, it would not matter if the concrete portion of the shell were cracked. The inside pipe surface of the plastic shell would prevent sediment from the concrete from coming into contact with the inside of the conduit.

As described above, one of the major uses of the conduit of the invention is as housing for subterranean cables. However, it will be appreciated that the conduit has a wide array of other used including, for example, as piping. When the conduit is used in a variety of applications in the same area it can be easily color coded to differentiate these uses.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are therefore to be regarded in a illustrative rather than a restrictive sense.

What is claimed is:

1. An elongated conduit segment which is suitable for coupling in end-to-end fashion with another conduit segment, comprising: an elongated concrete material tubular member having an inner surface, an outer surface and a bore extending in a longitudinal direction between open ends thereof; and a plastic, elongated conduit segment shell, which is resistant to deformation and which covers said inner surface and at least substantially all of said outer surface to help insulate the tubular member from mechanical shocks, the conduit segment shell being characterized by a longitudinally disposed bore therethrough between two open ends thereof, with the bore of the conduit segment shell being situated within the bore of the concrete tubular member, and the conduit segment shell being further characterized by a neck region at each of its open ends.

2. The conduit segment according to claim 1 wherein a gap is defined between at least a portion of said outer surface and an inner face of said shell.

3. The conduit segment according to claim 1 wherein said shell is a resin selected from the group consisting of polyethylene, polypropylene, acetal, polyvinylchloride, polycarbonate, polybutylene, nylon, polyester, urethane, fluorocarbon, butyrate and mixtures thereof.

4. The conduit segment according to claim 1 wherein the concrete material is Portland Cement.

5. The conduit segment according to claim 1 wherein said shell is a plastic resin containing a zeolite filler.

6. The conduit segment according to claim 1 having a substantially square cross section.

7. The conduit segment according to claim 6 wherein the shell which substantially covers the outside surface has a plurality of longitudinally disposed channels, evenly distributed around said skin.

8. The conduit segment according to claim 1 wherein the shell is polyethlene which completely covers the inner and outer surfaces of the concrete member.

9. The conduit segment according to claim 1 wherein the concrete material includes a fly ash filler.

10. The conduit segment according to claim 1 wherein the shell is a copolymer resin.

11. The conduit segment according to claim 5 wherein the zeolite filler comprises up to about 40% by weight of the shell.

12. The conduit segment according to claim 5 wherein the zeolite filler is present in an amount which is effective to dissipate heat within the shell.

13. The conduit segment according to claim 1 wherein the conduit segment shell has an outer surface which defines a filling hole.

14. An elongated conduit for housing electric cables comprising a plurality of conduit segments coupled end-to-end, each conduit segment comprising: an elongated concrete material tubular member having an inner surface, an outer surface and a bore extending in a longitudinal direction between open ends thereof; and a plastic, elongated conduit segment shell, which is resistant to deformation and which covers said inner surface and at least substantially all of said outer surface to help insulate the tubular member from mechanical shocks, the conduit segment being characterized by a longitudinally disposed bore therethrough between two open ends thereof, with the bore of the conduit segment shell being situated within the bore of the concrete tubular member, and the conduit segment shell being further characterized by a neck region at each of its open ends.

15. The conduit according to claim 14 further comprising a coupler, coupling said conduit segments.

16. The conduit according to claim 15 wherein said coupler is a tubular member which receives end portions of coupled conduit segments.

17. The conduit according to claim 16 wherein said tubular member has an inner surface coated with paraffin which contacts the outer plastic casing of the received end portions of coupled conduit segments.

* * * * *